US007323157B2

(12) United States Patent
Kinloch et al.

(10) Patent No.: US 7,323,157 B2
(45) Date of Patent: Jan. 29, 2008

(54) PRODUCTION OF AGGLOMERATES FROM GAS PHASE

(75) Inventors: Ian Anthony Kinloch, Cambridge (GB); Yali Li, Cambridge (GB); Alan H. Windle, Cambridge (GB); Stephen Lee Cash, N. Yorks (GB

(73) Assignee: Cambridge University Technical Services Limited (GB)

( * ) Notice: Subject to any disclaimer, the term of this patent is extended or adjusted under 35 U.S.C. 154(b) by 608 days.

(21) Appl. No.: 10/794,810

(22) Filed: Mar. 8, 2004

(65) Prior Publication Data

US 2005/0006801 A1 Jan. 13, 2005

(30) Foreign Application Priority Data

Jul. 11, 2003 (GB) ................................ 0316367.2

(51) Int. Cl.
*D01C 5/00* (2006.01)
(52) U.S. Cl. .................... 423/447.3; 977/843
(58) Field of Classification Search ............. 423/447.1, 423/447.3
See application file for complete search history.

(56) References Cited

U.S. PATENT DOCUMENTS

| | | | | |
|---|---|---|---|---|
| 3,294,880 A * | 12/1966 | Turkat | ....................... | 264/29.2 |
| 3,375,308 A * | 3/1968 | Turkat | ....................... | 264/29.2 |
| 3,696,603 A * | 10/1972 | Kotter et al. | .................. | 57/402 |
| 5,707,916 A * | 1/1998 | Snyder et al. | ............... | 502/180 |
| 7,157,069 B2 * | 1/2007 | Jurng et al. | ............... | 423/447.3 |
| 7,160,531 B1 * | 1/2007 | Jacques et al. | ........... | 423/447.3 |
| 2002/0090331 A1 * | 7/2002 | Smalley et al. | ............. | 422/198 |
| 2002/0094311 A1 * | 7/2002 | Smalley et al. | ............. | 422/198 |

OTHER PUBLICATIONS

M.S. Dresselhaus, G. Dresselhaus & P.C. Eklund, Science of Fullerenes and Carbon Nanotubes, 121-125 (Academic Press 1996).*
Chris Rorres, The Turn of the Screw: Optimal Design of an Archimedes Screw, 126 Journal of Hydraulic Engineering 72 (2000).*
Gesser, et al., Aerogels and Related Porous Materials, Chem. Rev. 1989; 89: 765.*
Li, et al., Direct Spinning of Carbon Nanotube Fibers from Chemical Vapor Deposition Synthesis. Science 2004; 304: 276.*
International Search Report for Patent Application No. PCT/GB 2004/002969, dated Mar. 7, 2005, 2 pages.
International Preliminary Report on Patentability for Patent Application No. PCT/GB 2004/002969 dated Jan. 16, 2006, 6 pages.
H.W. Kroto, J.R. Heath, S.C. O'Brien, R.F. Curl and R.E. Smally, *Nature* 318, 162 (1985).
S. Iijima, *Nature* 354, 56 (1991).
W. Kratschmer, L.D. Lamb, K. Fostiropoulos and D.R. Huffman, *Nature* 347, 354 (1990).
W.E. Alvarez et al., Carbon 39 (2001) 547-558.
Brigitte Vigolo, Alain Penicaud, Claude Coulon, Cedric Sauder, Rene Pailler, Catherine Journet, Patrick Bernier and Philippe Poulin "Macroscopic Fibres and Ribbons of Oriented Carbon Nanofibres", *Science* 290, 1331 (2000).
Kaili Jiang, Qunqing Li, Shousan Fan, "Spinning Continuous Carbon Nanotube Yarns" *Nature* 419, 801 (2002).
H.W. Zhu, C.L. Xu, D.H. Wu, B.Q. Wei, R., Vajtai and P.M. Ayahan "Direct Synthesis of Long Single-Walled Carbon Nanotube Strands," *Sciencel*, 296 (2002) 884-886.

* cited by examiner

*Primary Examiner*—Stuart L. Hendrickson
*Assistant Examiner*—Daniel C. McCracken
(74) *Attorney, Agent, or Firm*—Goodwin Procter LLP

(57) ABSTRACT

A process for production of an agglomerate comprises the steps of:
   passing a flow of one or more gaseous reactants into a reactor;
   reacting the one or more gaseous reactants within a reaction zone of the reactor to form product particles;
   agglomerating the product particles into an agglomerate; and
   applying a force to the agglomerate to displace it continuously away from the reaction zone.

18 Claims, 11 Drawing Sheets

PRODUCTION OF AGGLOMERATES FROM GAS PHASE

Figure 1:
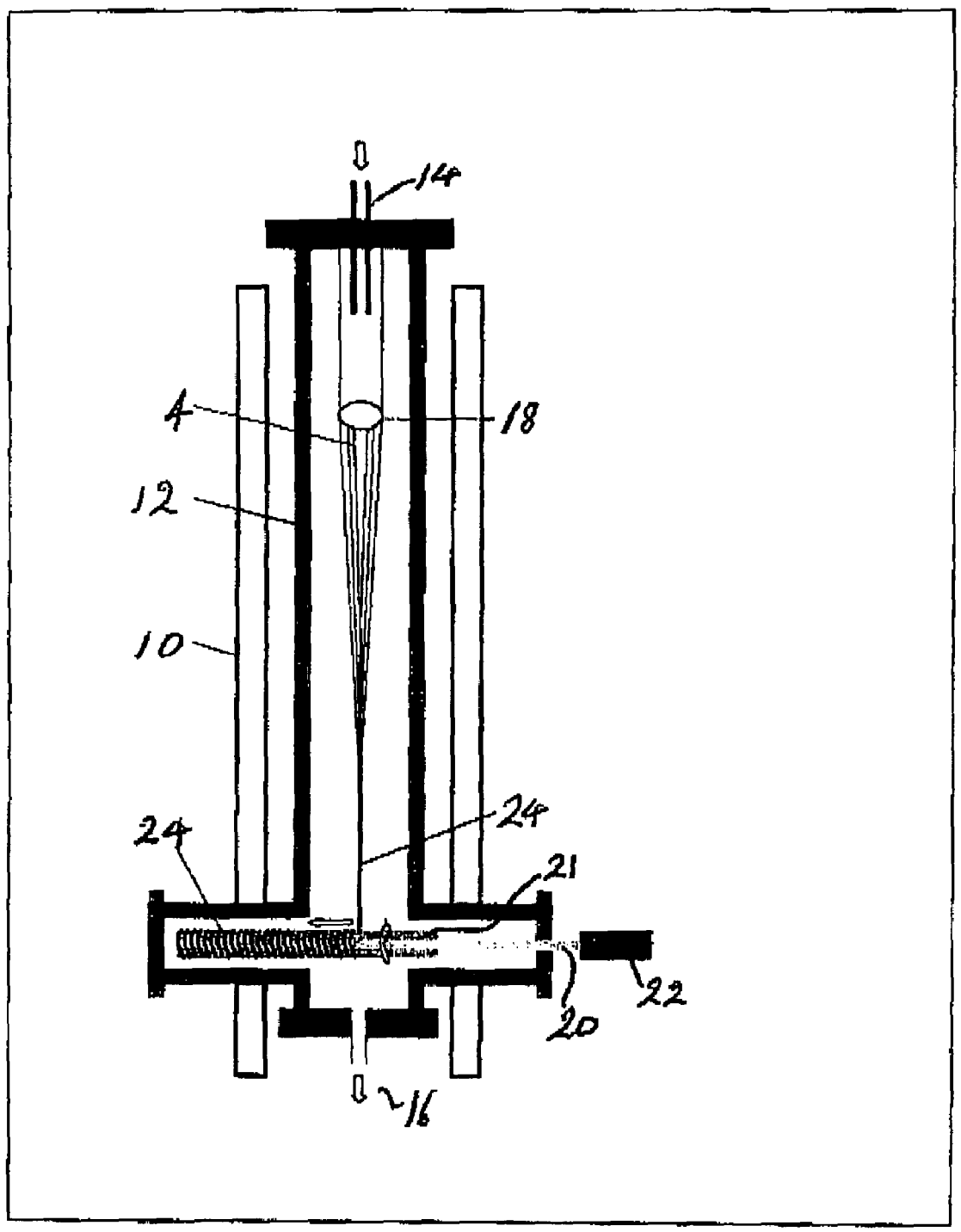

This application claims priority from United Kingdom Patent Application No. 0316367.2, filed Jul. 11, 2003, herein incorporated by reference in its entirety, including, but not limited to the figures by reference.

FIELD OF THE INVENTION

The present invention relates to a process for producing agglomerates, for example fibres or films of single-walled or multi-walled carbon nanotubes, and to agglomerates so produced.

BACKGROUND OF THE INVENTION

Carbon nanoparticles have received a great deal of attention since the discovery of the $C_{60}$ buckminster fullerene molecule (H. W. Kroto, J. R. Heath, S. C. O'Brien, R. F. Curl and R. E. Smally, Nature 318, 162 (1985)) and the carbon nanotube (S. Ijima, Nature 354, 56 (1991)). Carbon nanoparticles are typically 1 to 100 nm in at least one dimension, carbon nanotubes however being up to a few millimetres in length. The explosion in $C_{60}$ research in the early 1990s was driven by the production of large quantities (few milligrams) of the material by Krastchmer et al. (W. Kratschmer, L. D. Lamb, K. Fostiropoulos and D. R. Huffman, Nature 347, 354 (1990)) using a high pressure arc discharge method.

The remarkable mechanical and electronic properties exhibited by carbon nanotubes have encouraged efforts to develop mass production techniques. As a result, carbon nanotubes are becoming increasingly available, and more attention from both academia and industry is focused on the application of carbon nanotubes in bulk quantities. These opportunities include the use of carbon nanotubes as a conductive filler in insulating polymer matrices, and as reinforcement in structural materials. Other potential applications exploit the size of carbon nanotubes as a template to grow nano-sized, and hence ultra-high surface-to-volume ratio, catalysts or aim to combine carbon nanotubes to form nano-electronic elements.

The high cost and low production volume of carbon nanotubes are at present prohibitive for their use as a filler material in most large-scale structural and electrical applications. Presently, several industrial and governmental projects are underway to mass-produce several kilograms of single and multi-walled carbon nanotubes in a cost-effective manner.

Carbon nanotubes have been produced previously using various approaches including the laser or arc-discharge ablation of a carbon/catalyst mixture target. For larger scale synthesis, the most promising methods have been based on chemical vapour deposition (CVD). CVD typically uses a cheap feedstock and has relatively low energy requirements, and has therefore attracted interest for the purposes of bulk synthesis. In CVD methods, a carbon-containing gas is decomposed at high temperatures in the reaction zone of a furnace under the influence of a finely divided catalyst (usually iron, nickel, cobalt or other transition metals or alloys).

Catalyst particles may be manufactured in situ by the decomposition of metalloorganic compounds or may be introduced into the CVD furnace on a fixed substrate (W. E. Alvarez et al., Carbon 39 (2001) 547-558; WO00/17102; WO00/73205). For the growth of small nanotubes and single-walled nanotubes in particular, very small metal clusters (around 1 nm) are required.

Current CVD processes have the disadvantage that growing fibres condense at the low temperature region downstream of the reaction zone to form highly cross-linked networks. These networks block the flow of the gaseous carbon source, typically within 1 to 2 minutes from the start of the process. The blocking of the gas flow leads to a significant change in pressure and chemical composition at the reaction zone, with the result that the structure of the products is changed and the overall yield is reduced. This means that to achieve good results the products must be removed regularly, so that a continuous process is not possible.

In addition, the quality of the carbon nanotube products produced in this way is not controlled. Large carbon particles, amorphous carbon and thick diameter fibres are typically produced.

It is desirable to produce carbon nanotubes in the form of fibres or other agglomerates for ease of handling, or making objects in desired shapes or coatings on components for direct applications.

Attempts have been made to process cross-linked carbon nanotube networks into carbon nanotube fibres by dispersing the networks in an organic solution and drying the solution. The fibrous product thus obtained is a composite of carbon nanotubes and polymer (Brigitte Vigolo, Alain Penicaud, Claude Coulon, Cedric Sauder, Rene Pailler, Catherine Journet, Patrick Bernier and Philippe Poulin, "Macroscopic Fibres and Ribbons of Oriented Carbon Nanofibres", Science 290, 1331 (2000)). Coagulation spinning of fibres from carbon nanotubes is also reported in US 2002/0113335 A (Lobovsky et al.).

It has been shown that a 30 cm long fibre of carbon nanotubes could be drawn from a network on a silicon substrate (Kaili Jiang, Qunqing Li, Shoushan Fan, "Spinning continuous carbon nanotube yarns" Nature 419, 801 (2002)).

Recently a 20 cm long fibre of single-walled carbon nanotubes was observed in the products of a CVD process (H. W. Zhu, C. L. Xu, D. H. Wu, B. Q. Wei, R. Vajtai and P. M. Ayajan, "Direct Synthesis of Long Single-Walled Carbon Nanotube Strands", Science, 296 (2002) 884-886). However, this document does not disclose how to control the process to produce such fibres in high yield. The present inventors have found that the products produced in this way contain a high proportion of soot, and the fibres were obtained only in a small fraction of the products with a much narrower synthesis conditions window.

BRIEF SUMMARY OF THE INVENTION

Accordingly, in a first aspect the present invention provides a process for production of an agglomerate, comprising the steps of:
  passing a flow of one or more gaseous reactants into a reactor;
  reacting the one or more gaseous reactants within a reaction zone of the reactor to form product particles;
  agglomerating the product particles into an agglomerate; and
  applying a force to the agglomerate to displace it continuously away from the reaction zone.

The term "fibre" is used generally to refer to structures which are larger in one dimension than in the other two dimensions. Fibres may be generally circular in cross-section (thread-like fibres), or generally rectangular in cross-section (ribbon-like fibres), or may have other shapes. The fibres may be hollow. The term "mat" is used generally to refer to structures which are smaller in one dimension that in the other two dimensions. Mats may be flat or curved in shape.

Optionally, the force applied to the product particles is a mechanical force.

The mechanical force may be applied by means of a rotating spindle on which the fibre is wound. In this way, the fibre is collected on the spindle, or after making one or more turns around the spindle may be wound off continuously and accumulated elsewhere. Suitably, the spindle axis is perpendicular or parallel to the direction of flow of the one or more gaseous reagents, but other orientations of the spindle axis may also be used. For example, a spindle at an angle of 25° to the direction of gas flow has been used successfully.

The spindle may rotate around two axes, for example around two perpendicular axes. In particular, the spindle may rotate around axes perpendicular and parallel respectively to the direction of flow of the gaseous reagents. Such a spindle pulls and twists the fibre so that the number of twists per metre can be controlled.

The spindle may be formed of metal, ceramics or polymers ith different shapes. The spindle may be used as a template or making an object (for example a carbon object) by a process of spin-coating. Preferred spindles are rod-shaped or box-shaped. The coating thickness and the alignment of the carbon products can be controlled by means of the reaction time and reaction conditions, or differential movement, which could be coupled with applying electrical or other fields, including gas flow induced forces. The coating can be strengthened by impregnation, for example with a material which forms a solid matrix such as polyurethane, polyester or epoxy resin. Impregnation can take place either during or after the spin-coating.

Preferably, the spindle rotates at a rate of 0.01 to 10000 rpm. More preferably, the spindle rotates at a rate of 0.1 to 100 rpm. The spinning rate may be adjusted so that the material is collected at a similar rate to which it is produced. The rotation rate may also be used to control the thickness of the fibre. In one preferred embodiment, the spindle processes axially as it rotates. This means that the fibre is wound evenly along the spindle rather than at one location only.

Other arrangements used in fibre technology may also be used.

The agglomerate may for example be collected via a substrate placed in the reactor, for example on the walls of the reactor. The substrate may be a fixed or rotating guide used to apply a strong and even force to the agglomerate as it is collected. A suitable arrangement which is used in fibre technology consists of two guides positioned at right angles to one another.

Optionally, the mechanical force applied to the product particles is applied by an accelerating gas flow. Suitably, the accelerating gas flow is produced by passing the product particles through a reactor with narrowing diameter or through a capillary downstream of the reaction zone. A vacuum may be applied to the product particles.

Alternatively, the force applied to the product particles may be an electrostatic force, suitably applied by means of a charged plate. In this case, it is of course necessary that the product particles be charged. Use of a charged plate may lead to formation of an agglomerate in the form of a mat coating the charged plate.

As a further alternative, the force applied to the product particles may be a magnetic force, or may be photon pressure applied by a light source.

The gaseous reagents may be injected in the form of a liquid. The reagents may be injected via a single inlet or via multiple inlets, for example in a showerhead arrangement.

Optionally, the process includes a start-up step to initiate production of the agglomerate. Suitable techniques include using a suction gun or compressed air to initiate agglomeration, or extending a mobile substrate from the reactor along the desired product path. Suitably, the mobile substrate is a wire coated with adhesive. The wire will initiate agglomeration and the agglomerated particles will adhere to the wire so that they can be pulled out of the reactor by applying a force to the wire.

Optionally, a seeding particle is contacted with the product particles to promote initial agglomerate formation.

Optionally, the reactor contains a catcher to promote agglomerate formation. The catcher may be in the form of a ring through which product particles pass, or in the form of a rod which may be suspended from an injector.

Preferably, the product particles are anisotropic. In preferred embodiment, the product particles are fibrillar. The fibrillar product particles may be either aligned or non-aligned within the agglomerate. Suitably, the fibrillar product particles are nanodimensional.

Preferably, the one or more gaseous reagents are reacted at a temperature of 500 to 1600° C. More preferably, the one or more gaseous reagents are reacted at a temperature of 1000 to 1500 or 1600° C. Suitably, a temperature gradient is maintained within the reactor with the reaction zone being at a higher temperature than the product zone of the reactor.

The gaseous reactants may be mixed with one or more gases acting as a diluent. The gaseous reactants may also be mixed with gases which play no direct role in the reaction but which play a contributory role, for instance where the product is carbon nanotubes, by reacting with amorphous carbon as it is formed (as a by-product) and so keeping the reaction sites on the catalyst clean and available for nanotube formation.

Gases which may be used as diluent include argon or other inert gases, hydrogen, nitrogen, ammonia, carbon dioxide or helium. Hydrogen is particularly preferred. Suitably, the diluent flow rate is up to 2000 ml/min. Preferably, the diluent flow rate is 400 to 800 ml/min.

Preferred gas pressures for the gaseous reactants and optional diluent are from 0.1 to 50 bar A, preferably from 0.5 to 5 bar A, more preferably 1 to 2 bar A. The gaseous effluent from the furnace may be recycled, with or without clean-up.

The product may be controlled by monitoring the agglomerate product and altering the reaction conditions in accordance with the information obtained. For example, the product may be monitored by online Raman spectroscopy. For carbon nanotubes this will indicate the single walled or multi-walled nature of the nanotubes, the diameter of the nanotubes and the crystallinity of the nanotubes. The product may also be monitored by online conductivity measurements, gas analysis, monitoring the opacity of the reaction zone and/or monitoring the wind-up force. The reaction conditions may be altered by an operator or automatically.

Preferably, air is prevented from entering the reactor as the agglomerate is removed from the reactor. This is particularly important where the diluent gas includes hydrogen, since otherwise an explosive mixture of hydrogen and air may be formed in the reactor.

Air may be prevented from entering the reactor in various ways. Suitably, the agglomerate is removed from the reactor via a U-tube trap containing liquid, for example silicone oil or a treatment liquid. The liquid acts as a seal to prevent air from entering the reactor. Gas from the reactor may escape via an exhaust pipe from the U tube.

Alternatively, the agglomerate may be removed from the reactor via a valve which prevents air from entering the reactor.

Optionally, the process further comprises the step of contacting the agglomerate with a treatment fluid, for example by passing the agglomerate through a bath of treatment liquid or by spraying the agglomerate with a treatment gas. Useful treatment liquids include adhesives and lubricants, for example polymer, organosilanes, or polyureasilazane, or acid.

Optionally, the process further comprises the step of annealing the agglomerate with one or more fibres by heating.

Optionally, where the agglomerate is a fibre, the process further comprises the step of spinning the fibre with one or more other fibres.

Optionally, the process further comprises the step of respinning a fibre from the agglomerate, or drawing a fibre from the agglomerate. This may be used to improve alignment of product particles and to improve mechanical properties. This step may be preceded or followed by washing.

Optionally, two or more fibre treatment steps (e.g. redrawing, infiltration and heating) may be combined.

In preferred embodiments, the product particles comprise carbon, boron nitride or polymers, for example polypropylene, polybutadiene, polyisoprene, polystyrene, ethylene-propylene co-polymers or Nylon™.

Addition polymers can be formed from monomer feedstock in the gas phase for example in the presence of Ziegler-Natta catalysts. The continuous production of polypropylene is a suitable example. Here, the propylene may be injected in a gas phase at temperatures beneath its decomposition temperature and at a pressure close (but not limited to) atmospheric. The catalyst is suitable a mixture of zirconium dicyclopentadiene (or analogues such as the titanium dicyclopentadiene (DCP) with an add-mixture of aluminium alkyls such as (but not limited to) aluminium diethyl chloride. The ratio of the two species may be determined by the precise temperatures pressure and residence times required to give the desired molecular weight. The addition of the catalyst mixture to propylene at 70° C. and a pressure of ca atmospheric results in the conversion of a significant fraction of the propylene to polymer, with the unreacted propylene being available for recycle. As the polypropylene is formed, it may be captured and pulled from the reaction zone as a continuous fibre.

In preferred embodiments, the product particles comprise carbon nanotubes or carbon nanofibres. In particular, the product particles may comprise single-walled carbon nanotubes, multi-walled carbon nanotubes or a mixture of single-walled and multi-walled carbon nanotubes.

Suitably, the carbon nanotube product particles are produced by chemical vapour deposition wherein the gaseous reactant is a carbon source and the carbon source is reacted in the presence of a catalyst.

Suitable carbon-containing compounds for use as the carbon source include carbon monoxide, carbon dioxide and hydrocarbons, including aromatic hydrocarbons, e.g. benzene, toluene, xylene, cumene, ethylbenzene, naphthalene or mesitylene, non-aromatic hydrocarbons, e.g. methane, ethane, propane, butane, pentane, hexane, cyclohexane, ethylene, propylene or acetylene, and oxygen-containing hydrocarbons, e.g. formaldehyde, acetaldehyde, acetone, methanol, ethanol, diethylether, polyethylene glycol, 1-propanol, ethyl formate or a mixture of two or more thereof. In preferred embodiments, the carbon-containing compound is carbon monoxide (CO), methane, ethylene or acetylene.

Preferably, the carbon source contains oxygen. Ethanol is a particularly preferred carbon source. Oxygen may be introduced into the reactor in other ways, for example by using a diluent gas or carbon source containing water.

Suitably, the carbon source is injected at a rate of 0.01 to 10 ml/min. Preferably, the carbon source is injected at rate of 0.08 to 0.25 ml/min.

The catalyst is suitably a transition metal, particularly the Group VIB chromium (Cr), molybdenum (Mo), tungsten (W) or Group VIIIB transition metals, e.g., iron (Fe), cobalt (Co), nickel (Ni), ruthenium (Ru), rhodium (Rh), palladium (Pd), osmium (Os), iridium (Ir) and platinum (Pt), or manganese (Mn) or mixtures thereof. Metals from the lanthanide and actinide series (for example yttrium (Y)) may also be used. Preferred are Fe, Ni, Co, Mo and mixtures thereof such as a 50/50 mixture (by weight) of Ni and Co, or a mixture of Fe and Ni, or a mixture of Fe and Mo. Any of these transition metals individually or in combination with any of the other transition metals listed may be used in clusters to serve as a catalyst for carbon nanotube growth. Particularly preferred catalysts are mixtures of two or more of the listed metals.

The catalyst is preferably formed by decomposition of a precursor. The precursor is preferably a heat or light or plasma decomposable compound of one or more metals listed above, such as a carbonyl or cyclopentadienyl organometallic compound. Preferred precursors include ferrocene, iron pentacarbonyl, nickelocene and cobaltocene. Suitably, at least 0.01 wt % precursor is included in the carbon source, Preferably, 0.2 to 2.5 wt % precursor is included, for example 0.23 to 2.3 wt % precursor is included.

A catalyst substrate may also be present. Suitable catalyst substrates include silica and magnesium oxide.

Preferably, the carbon source is reacted in the presence of a promoter. Suitably, the promoter is one or more of sulphur, phosphorus, molybdenum and organic compounds of these elements. Thiophene is a preferred promoter. Suitably, up to 10 wt % promoter is included in the carbon ource. Preferably, 0.2 to 6 wt % promoter is included. It has been found that where high or low concentrations of thiophene are used, multi-walled carbon nanotubes are formed whereas when intermediate concentrations of thiophene are used single walled carbon nanotubes are formed. For example, using ethanol with 0% or 1.5 to 4.0 wt % thiophene and 2.3 wt % ferrocene, an injection rate of 7.5 ml/hour, a hydrogen flow rate of 400 to 800 ml/min and a synthesis temperature of 1100 to 1180° C. multi-walled carbon nanotubes were formed. Using ethanol with 0.5 to 1.5 wt % thiophene and 2.3 wt % ferrocene, an injection rate of 7.5 ml/hour, a hydrogen flow rate of 1200 ml/min and a synthesis temperature of 1200° C., single walled carbon nanotubes were formed.

In a second aspect, the present invention provides an object coated in aligned carbon nanotubes. The object may be formed by spin-coating using the method of the invention. The object may be impregnated, for example with PVC or epoxy resin.

In a third aspect, the present invention provides a carbon fibre produced by the method described above. Preferably, fibres produced in accordance with the invention have strength of at least 0.05 N/Tex, and more preferably of at least 0.5 N/Tex (equivalent to 0.10 and 1.0 GPa, assuming a density of 2.0 g/cc). Preferably, the strain to failure exceeds 100%.

In a fourth aspect, the present invention relates to a carbon nanotube fibre having a length of at least 50 cm, for instance at least 100 cm. More preferably, the carbon fibre has a length of at least 1 m, for example a length of at least 10 m.

Preferably, the mechanical properties of carbon fibres of the invention can be improved by drawing or respinning. Suitably, drawing or respinning elongates the fibre by at least 25%, or more preferably by at least 50%.

Uses of carbon fibres of the invention include:
1. Polymer fillers
   This use takes advantages of the mechanical, electrical and thermal properties of the fibres. The fibres can be woven into pre-pregs. Spin coating can be used to form objects having complicated shapes.
2. Conductive textiles used in smart clothing
3. Electrodes
4. Gas absorption for filters
5. Gas storage In a fifth aspect, the present invention provides a process for production of a carbon nanotube agglomerate, comprising the steps of:
   reacting a carbon source within a reaction zone of a reactor to produce carbon nanotubes; and
   agglomerating the carbon nanotubes into an agglomerate by applying a force to the carbon nanotubes.

Suitably, the carbon nanotubes are produced by chemical vapour deposition, laser ablation or electric discharge.

In a sixth aspect, the invention relates to a process for the production of a fibrous aggregated body comprising generating fibrils suspended in gas by reaction of a precursor substance in a reaction zone and condensing the fibrils together to form said body and continuously withdrawing said body from the vicinity of the reaction zone.

Optionally, the fibrils are aligned within the aggregated body. The fibrils may be entangled within the aggregated body.

Preferably, the aggregated body is a fibre.

In a seventh aspect, the present invention relates to a process for production of an aggregated body of nanotubes comprising generating nanotubes in a reaction zone and condensing the nanotubes together to form said body and continuously withdrawing said body from the vicinity of the reaction zone.

In an eighth aspect, the invention relates to a process for production of an aggregated body of nanotubes comprising generating nanotubes in a reaction zone and continuously electrostatically attracting the nanotubes from the reaction zone and collecting the nanotubes as said aggregated body.

In a ninth aspect, the invention relates to a process for production of a fibrous aggregated body comprising generating a cloud of fibrils suspended in gas by reaction of a precursor substance in a reaction zone and stretching the cloud by the application of a stretching force to the cloud to cause the fibrils to condense to form said body.

Features described in connection with the any aspect of the invention may also be used in connection with any other aspect of the invention.

BRIEF DESCRIPTION OF THE ACCOMPANYING DRAWINGS

Figure 2:
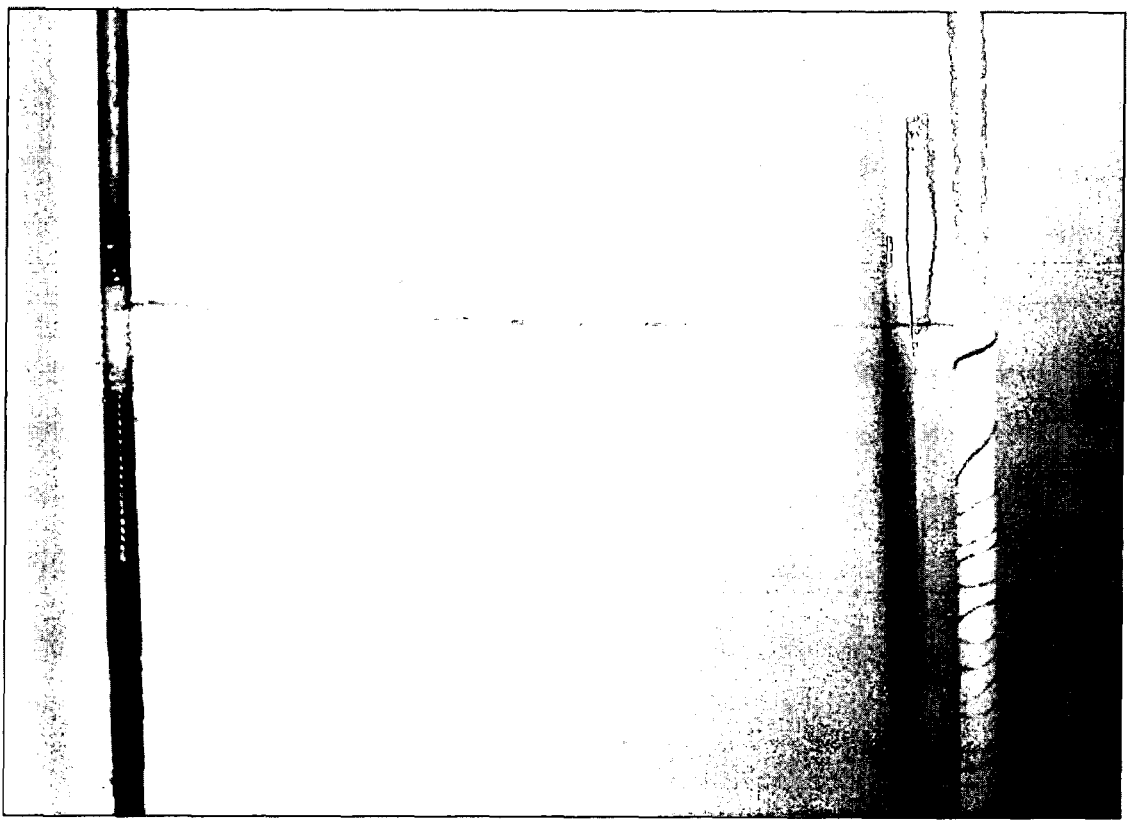
Figure 3:
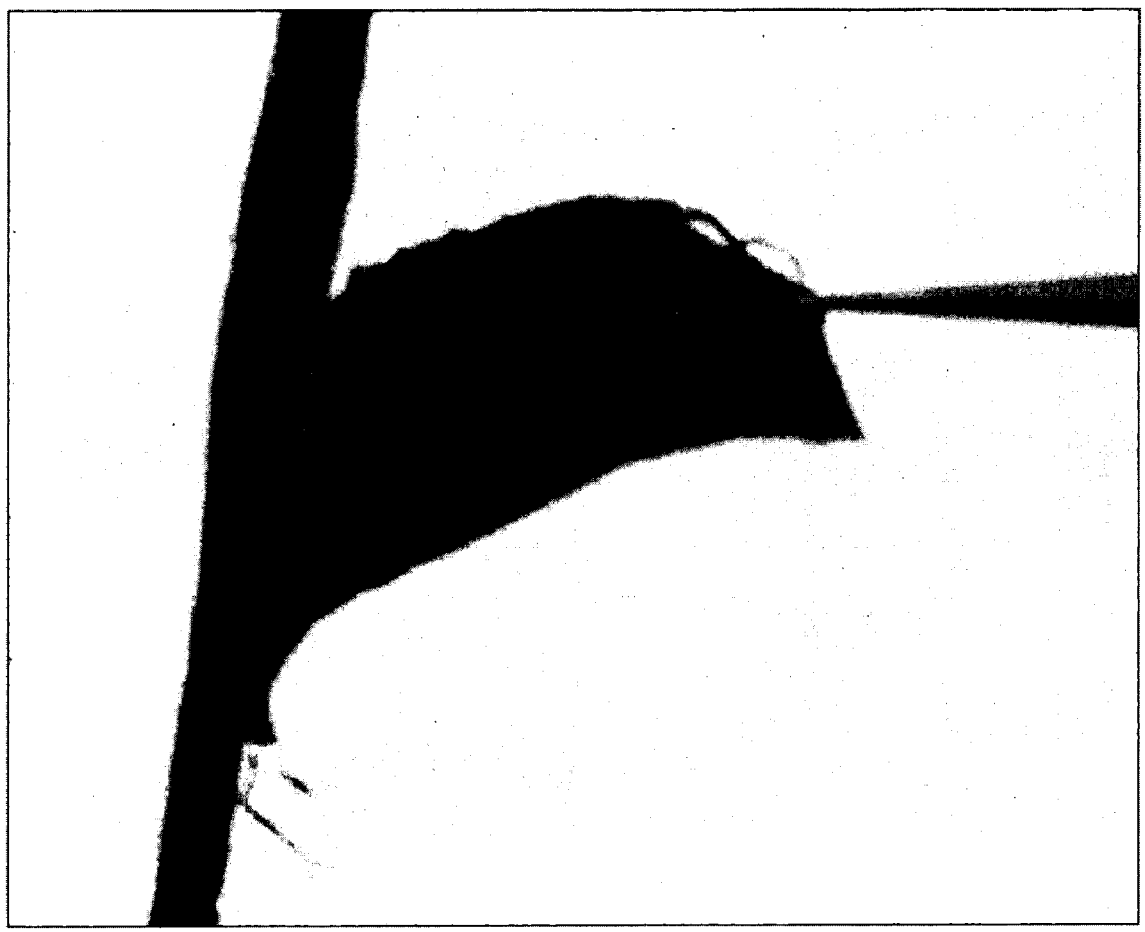
Figure 4:
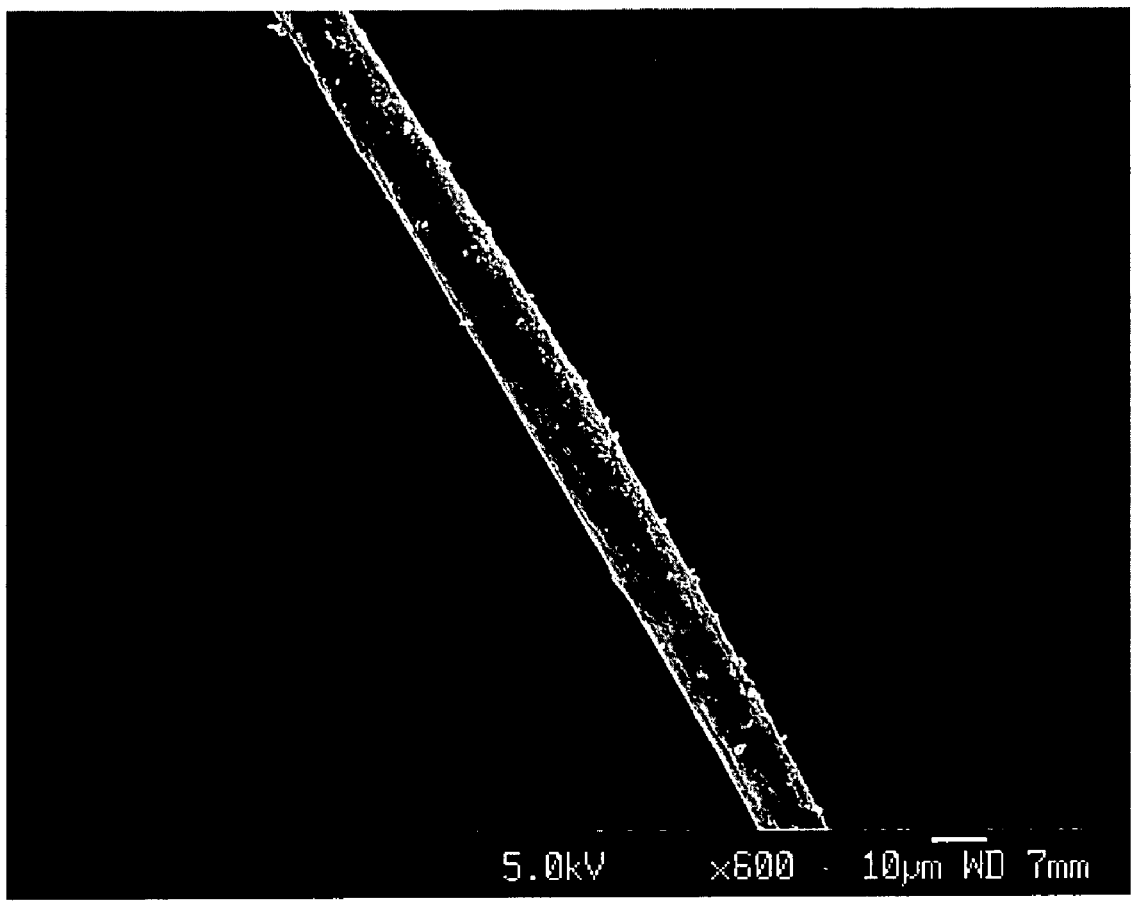
Figure 5:
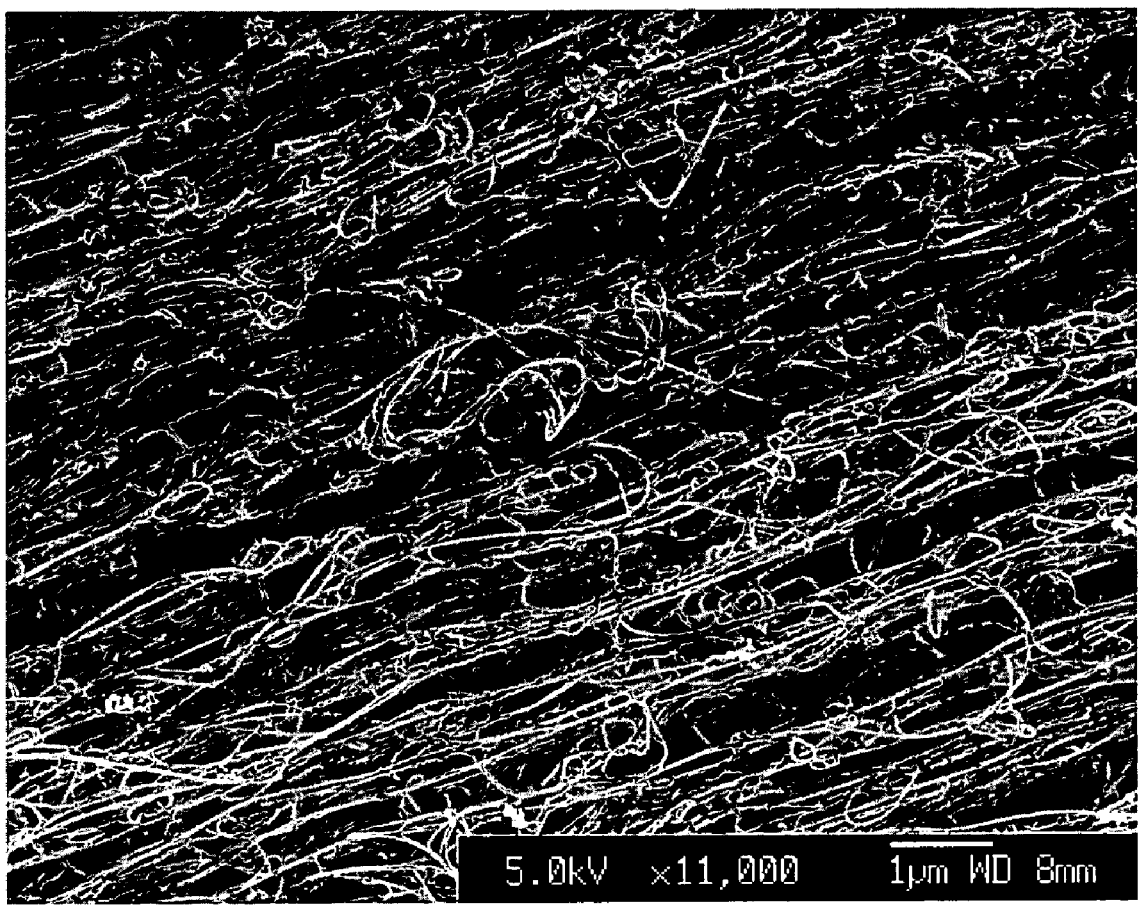
Figure 6:
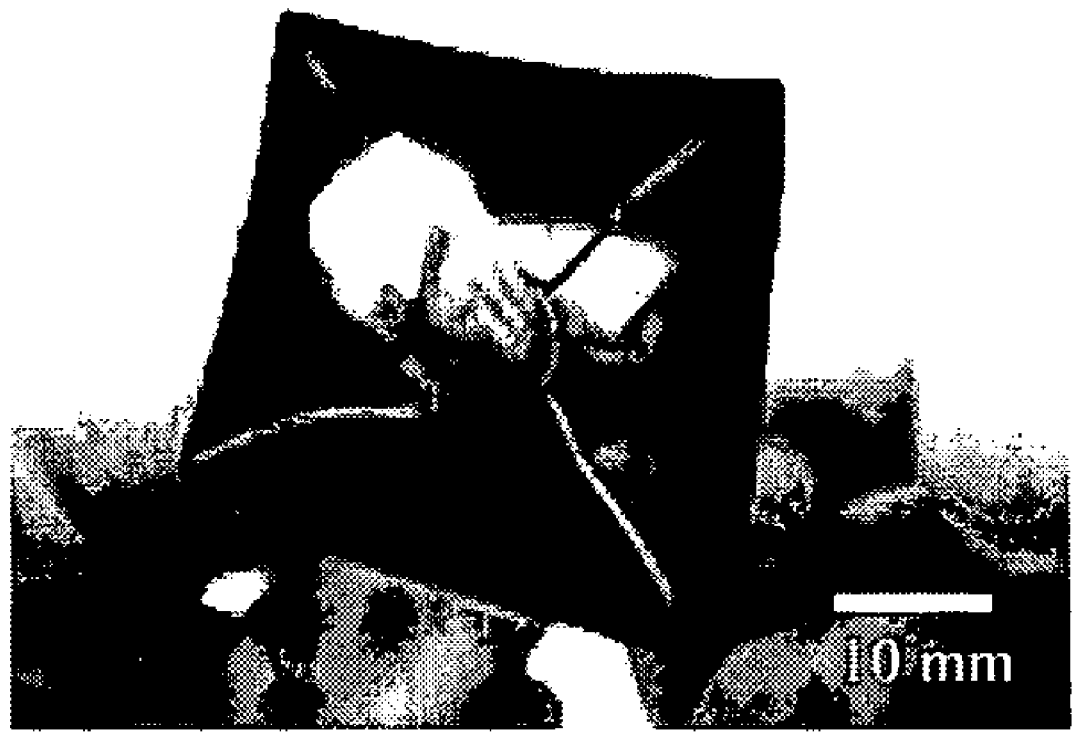
Figure 7:
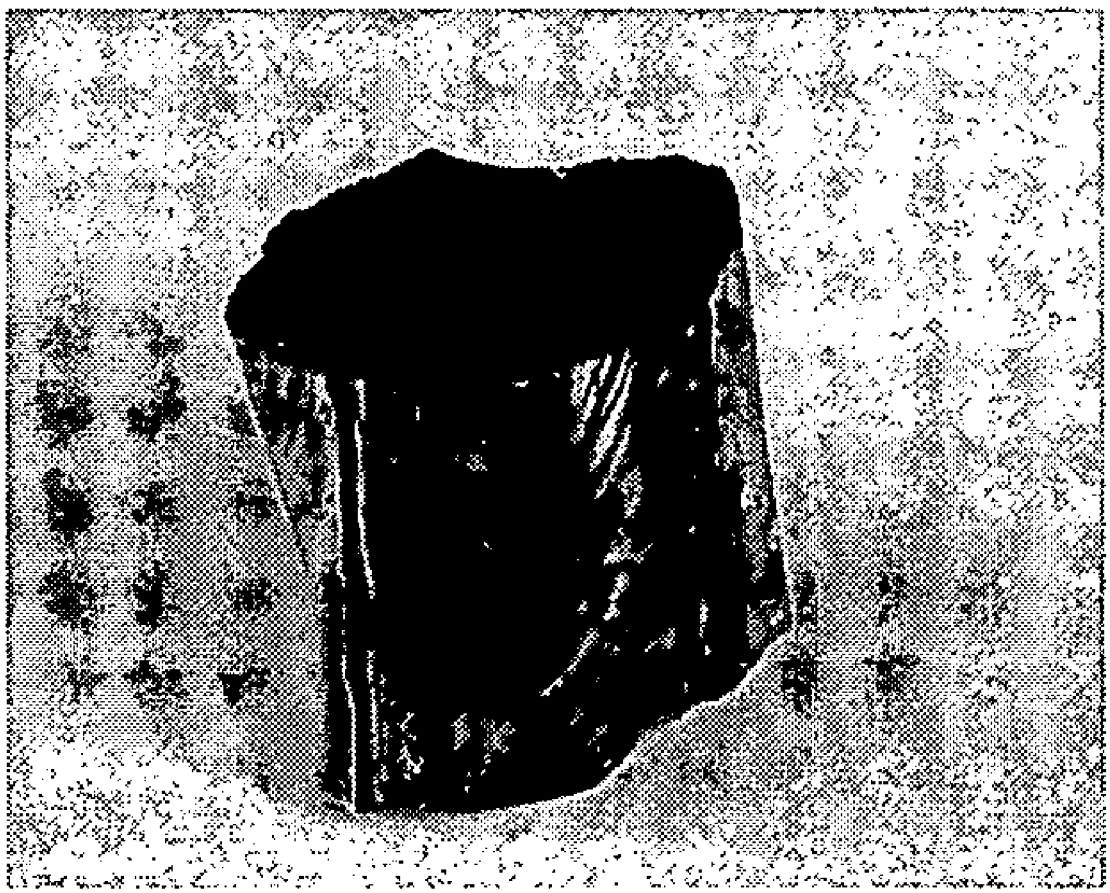
Figure 8:
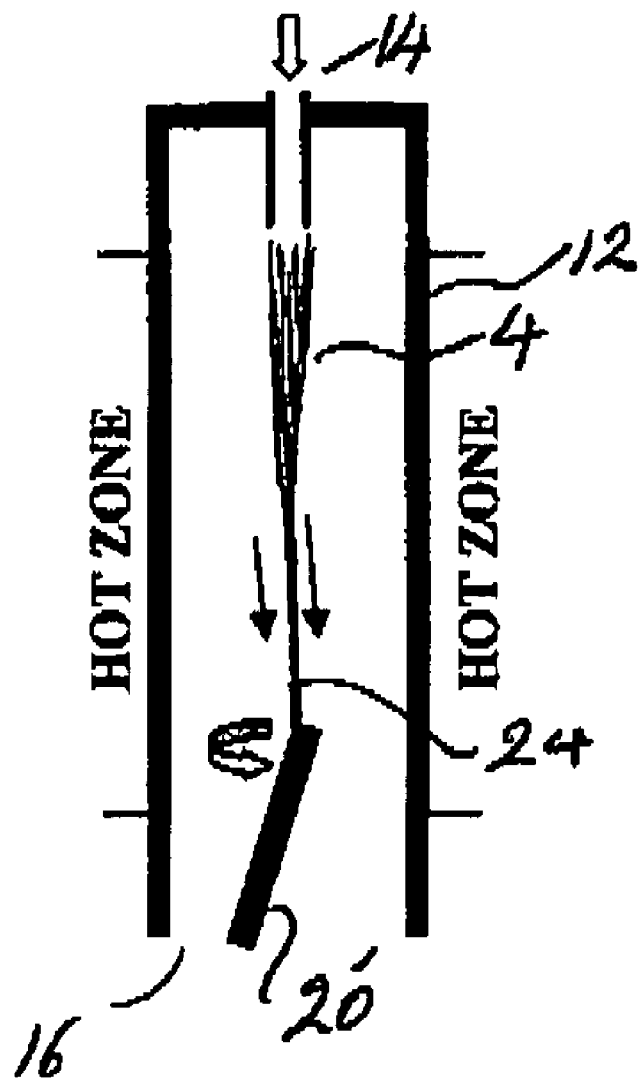
Figure 9:
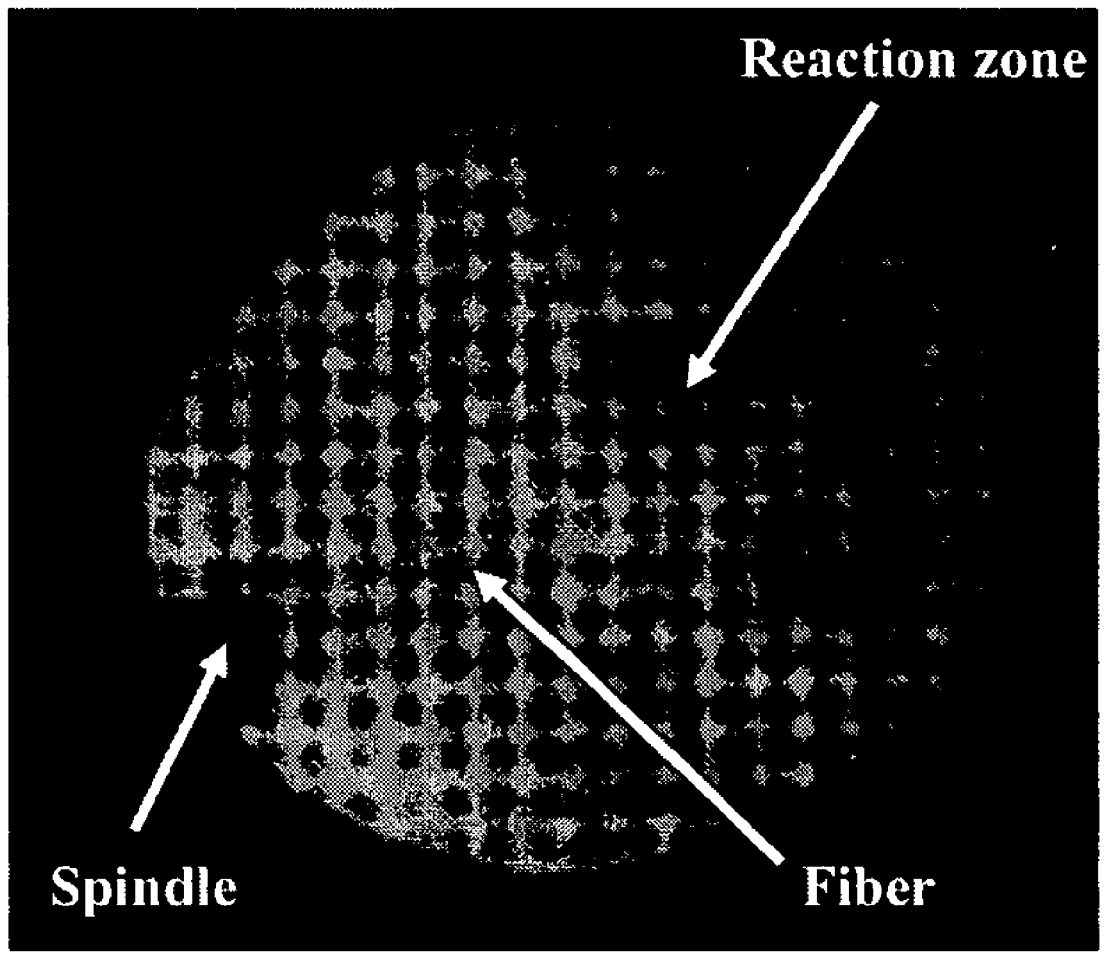
Figure 10A:
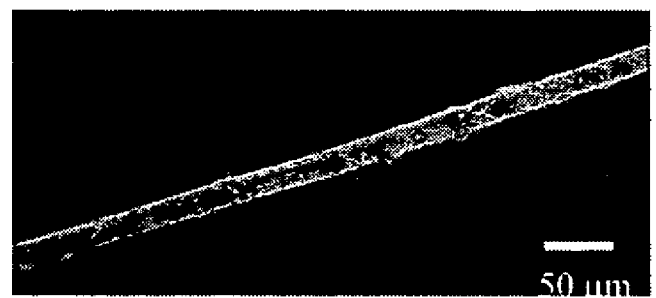
Figure 10B:
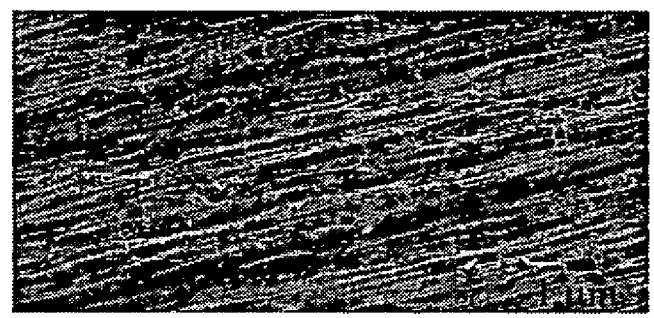
Figure 10C:
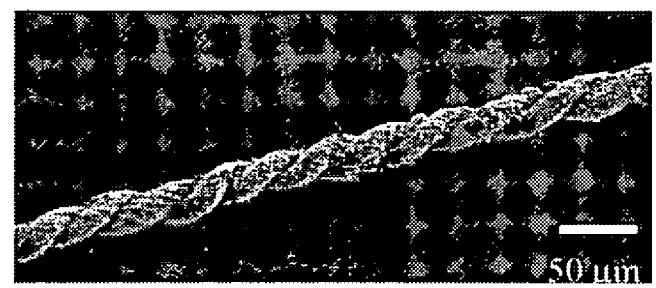
Figure 11:
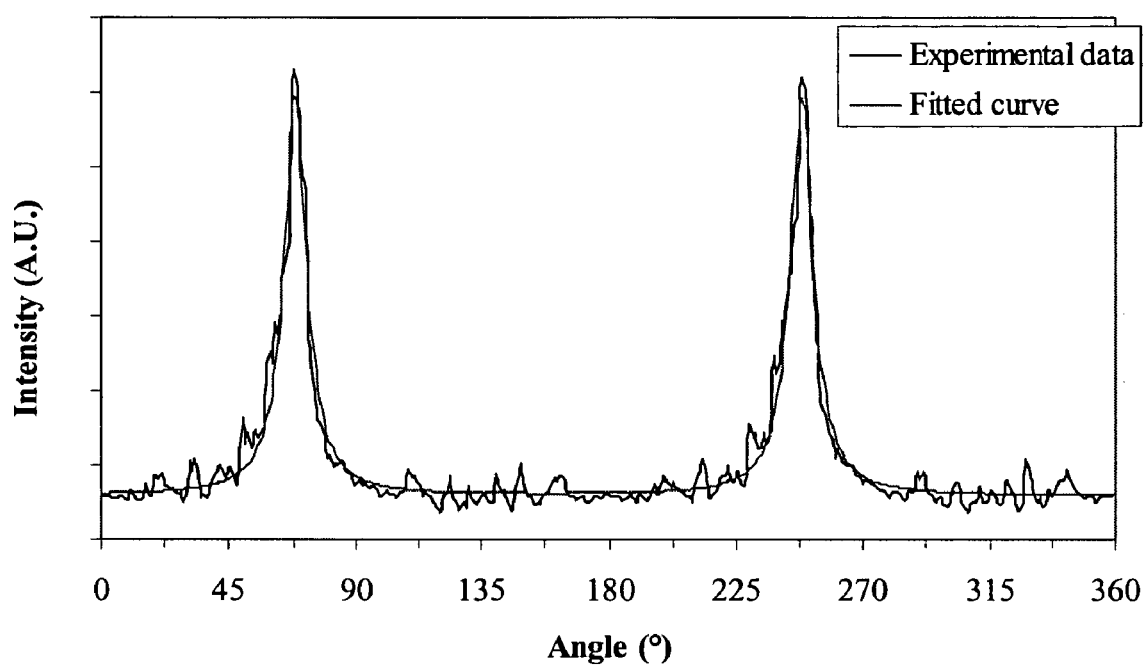

The invention will be further described with reference to the examples, as illustrated in the drawings, in which:
  FIG. 1 shows the apparatus used in Example 1.
  FIG. 2 shows a fibre produced in Example 1.
  FIG. 3 shows a mat of fibres produced in Example 1.
  FIG. 4 shows a fibre produced in Example 1.
  FIG. 5 shows a mat of fibres produced in Example 1 as seen by scanning electronic microscopy.
  FIG. 6 shows an end view of the spindle and product of Example 2.
  FIG. 7 shows the product of Example 2 after infiltration with PVC.
  FIG. 8 shows the apparatus of Example 4.
  FIG. 9 shows the reaction of Example 4.
  FIGS. 10A to 10C show a fibre produced in Example 4.
  FIG. 11 shows the intensity of the interference peak of the transform of the SEM image of the fibres of Example 4 measured around the azimuthal circle.

EXAMPLES

Example 1

In a preferred embodiment of the invention, the process is carried out in the apparatus shown in FIG. 1. The apparatus comprises a vertically arranged cylindrical furnace 10 enclosing a vertically arranged cylindrical quartz reactor 12. Alternative reactors may be conical in shape. The reactor 12 has an inlet 14 at its upper end and an outlet 16 at its lower end. Positioned within the reactor 12 close to the inlet 14 is a nanotube catcher 18 in the form of a ring of metal wire. In alternative embodiments, the nanotube catcher 18 may be a ring of glass wire or of a magnetic material. Positioned within the reactor 12 close to the outlet 16 is a horizontally extending screw 20, suitably a stainless steel screw of 300 mm in length. In alternative embodiments, the screw may extend vertically or in other directions. The screw 20 is connected to a motor 22 and carries an internally threaded rod 21.

In use, the furnace 10 is heated to a high temperature. A solution of catalyst precursor in a hydrocarbon solvent is injected into the reactor 12 via the inlet 14, suitably at a rate of 15 ml/hour, The screw 20 is rotated by means of the motor 22, suitably at a rate of 15 rpm, and advances the rod 21 horizontally as it is rotated.

Carbon nanotubes are formed as an aerogel (that is, a connected network of solid particles with gas occupying the space between the particles) in the form of a hollow sock within the reactor 12 by CVD reaction of the hydrocarbon solvent. The sock does not attach to the furnace walls which remain clean throughout the process.

The carbon nanotubes are collated by the nanotube catcher 18 to form a seeding fibre. Further nanotubes agglomerate with the seeding fibre to form a nanotube fibre 24. The fibre 24 is wound onto the screw 20. Wind-up speeds close to the velocity of the gaseous reactants can be achieved. The tension applied by winding of the fibre 24 onto the rod 21 of the screw 20 promotes further agglomeration of carbon nanotubes with the fibre 24 to extend the fibre 24.

This process may be run continuously for 30 minutes or longer. The fibre 24 is collected from the screw 20.

If no attempt is made to draw the aerogel out of the furnace, the aerogel travels down the reactor with the gas flow. As the aerogel reaches the cool end of the furnace (at about 500° C.) it sticks to the reactor walls and forms a diaphanous membrane across the tube which thickens with time.

If wind-up speed is too fast, the aerogel separates into discrete threads which are wound simultaneously onto the screw.

Portions of the aerogel are carried upwards within the furnace by convection currents and stick to the cooler wall or inlet 14 to form fibres which hang parallel to the reactor axis and continue to grow.

The fibre produced is shown in FIGS. 2 to 5.

In alternative embodiments, the screw 20 may be replaced by a rod which does not advance as it rotates. The rod may for example be ellipsoidal in shape.

In further alternative embodiments, a force may be applied to the carbon nanotubes without applying tension to the fibre 24. For example, such a force might be applied by using a reactor 12 which narrows towards its lower end, and optionally connecting a vacuum apparatus to the outlet 16. This would provide the necessary force via an accelerating gas flow. An accelerating gas flow might also be provided by pulling the carbon nanotubes through a narrow capillary, or by cooling the end of the reaction zone to cause gas contraction.

Alternatively, an electrostatic force might be applied by charging the nanotubes and positioning an oppositely charged plate at the lower end of the reactor 12. A magnetic force might also be applied.

A high hydrogen flow rate is found to suppress the undesirable formation of amorphous carbon. Replacement of hydrogen by argon is found in some cases to lead to the undesirable precipitation of particulate carbon. However, this is dependent on the nature of the carbon source. Replacement of hydrogen by argon has proved possible where methanol is used as the feedstock.

Example 2

A process as set out above was carried out using a modified version of the apparatus of FIG. 1.

Spinning was conducted at the cold end of the reactor using a modified reactor with a cross piece at the end section of the tube. Spinning was normal to the gas stream. The spindle was made of a metal wire in a cubic shape (20×20×50 mm) in order to provide a large area for winding.

The spindle was located just out of the furnace at a temperature of about 100° C.

A solution of 2.3 wt % ferrocene and 3.0 wt % thiophene in ethanol was used as both the feedstock and catalyst precursor. This solution was injected through a needle into the top of the reactor (internal diameter 65 mm, 1400 nm long) which was heated to 1180° C. A catcher in the form of a thin metal rod was suspended from the lower part of the injector lance to encourage the formation of a long thin fibre. Without the catcher, the aerogel developed into a web traversing the tube below the hot zone, which was more difficult to capture to start the wind-up.

Hydrogen (600 ml/min) was used as the carrier gas and the injection rate of the solution was 7.5 ml/h. The reactor remained clean and transparent without black deposit during the reaction because the ethanol-based system tended not to produce amorphous carbon. During reaction, an initial white glow was observed within the reaction zone at the upper end of the reactor (viewed via a mirror at the bottom of the furnace).

The spinning was conducted for typically 30 min and the process was observed continuously. A yarn consisting of continuous fibres of nanotubes was collected on the spindle.

Spinning at a higher rotating speed (60 rpm) produced nanotube fibres, while ribbons of nanotubes were obtained at a lower rotating speed (30 rpm).

The spindle became covered with an aligned nanotube film (FIG. 6). The film could be impregnated with resin (e.g. PVC) to produce a composite shell from which the spindle was removed (FIG. 7).

Example 3

Multi-walled carbon nanotubes were produced using the reaction conditions of Example 1 and a modified version of the apparatus of FIG. 1.

The nanotubes were spun by using a mechanically driven spindle which was placed either at the furnace temperature with the spinning direction parallel to the gas stream or outside the furnace with the spinning direction normal to the gas stream. In the high temperature-spinning configuration, stainless steel studding (inner diameter 6 mm, 200 mm long) was used as the spindle. The studding was driven by a motor at the base of the reactor and rotated at 85 rpm at an angle of 5° from the vertical, The studding protruded 15 mm into the not zone (1180° C.) and the nanotubes were mainly wound onto this part of the spindle. The spinning process inside the reactor was observed via a mirror fixed at the base of the reactor and recorded by a video camera from outside of the reactor.

Scanning electronic microscopy showed good alignment of the nanotubes in the fibre and thermal gravity analysis gave the purity of the nanotubes as 97 wt %.

Single-walled carbon nanotubes, as identified by Raman spectroscopy and transmission electron microscopy, were obtained by reducing the thiophene concentration (0.5 wt. %) and increasing the temperature (1200° C.) and hydrogen flow rate (1000 ml/min).

The length/diameter ratio of the nanotubes (single wall nanotubes and multi-walled nanotubes) was of the order of 1000. The diameter of the fibres was 20 to 50 µm, whereas the length of the fibres was limited only by the capacity of the wind-up.

The single walled nanotubes contained more impurities than the multi-walled nanotubes, with the proportion of single walled nanotubes estimated from TEM observations as being greater than 50 vol %.

The single walled nanotubes have diameters between 1.6 and 3.5 nm and are organised in bundles with lateral dimensions of 30 nm. Raman spectra reveal the typical radial breathing modes with peaks at 180, 243 and 262 $cm^{-1}$ using a 514.5 nm excitation laser.

Example 4

Example 2 was repeated using a further modified version of the apparatus of FIG. 1, which modification is shown in FIG. 8. The screw 20 and rod 21 were replaced by a spindle 20' at an angle of about 25° to the reactor axis and rotated about that axis at 60 rpm. Other numbered parts are as in FIG. 1/Example 1. This spindle penetrated the hot zone of the reactor (covering about 12% of the cross-sectional area of the tube) to capture the aerogel before it reached the cool region where it might stick to the walls.

FIG. 9 is a view along the reactor axis showing the rotating spindle drawing the fibre from the aerogel.

This arrangement produced continuous fibres with aligned nanotubes (FIGS. 10A and 10B) with a degree of twist (FIG. 10C) which were collected either at the top of the spindle or along its length.

The fibre alignment, purity and structure was characterised by electron microscopy, Raman spectroscopy and thermal gravimetric analysis (TGA).

The nanotube diameters were 30 nm with an aspect ratio of about 1000. The nanotubes contained 5 to 19 wt % iron but no extraneous carbon particles. The quality of alignment of the nanotubes was measured using SEM images. The FWHM (full width at half height) of the inter-nanotube interference peak measured around the azimuthal circle was about 11° (FIG. 11). However, there are indications that the degree of alignment can be improved if greater tension is applied to the fibre during processing.

The fibre was flexible and strong. The fibre was electrically conducting, with a best electrical conductivity of $8.3 \times 10^5$ ohm$^{-1}$·m$^{-1}$ which is slightly higher than the typical value for carbon fibres.

The spinning process used in Example 4 was found to give a highly pure carbon product making up the yarn (determined by TGA at 85 to 95 wt %), while a mat of nanotubes accumulated without spinning had a carbon content of 70-85 wt %.

In the latter case, it is possible that iron particles which have not generated nanotubes are caught by the nanotube membrane which forms across the cold end of the furnace. Sand-like powders were found at the base of the reactor after the spinning process, which were not characterized, but probably comprised the catalyst or its breakdown products. Thus, the spinning process improves the purity (carbon content and percentage of nanotubes) in the collected material.

Fibres made according to Example 4 may be of indefinite length, e.g. greater than 5 cm in length, more preferably greater than 50 cm in length, e.g. over 1 m.

Comparative Example 1

Example 2 was repeated without using the spindle. The aerogel travelled down the furnace with the gas flow which decelerated in the lower part of the furnace because of decreasing temperature (6.5 mm/s in the hot zone, 3.5 mm/s at the 500° C. point). As the aerogel reached the cool end of the furnace it stuck to the furnace walls and formed a diaphanous membrane across the furnace which thickened with time.

Whilst the applicant does not wish to be bound by this theory, it is believed that convection currents occur in the upper part of the furnace and are further strengthened by injection of comparatively cool feedstock down the furnace axis. The gas moves upwards at the furnace walls and downwards along the central furnace axis. As a consequence of this, portions of the nanotube aerogel appear to be carried upwards so that they stick to the cooler wall or injector to form a fibre which hangs downwards along the furnace axis. Additional nanotubes adhere to the fibre so that it continues to grow. These fibres may be similar to those reported by Zhu et al., but are not part of the continuous process of the preferred embodiment of the invention.

The invention claimed is:

1. A process for production of a fibre, comprising the steps of:
    passing a flow of one or more gaseous reactants into a reactor;
    reacting the one or more gaseous reactants within a reaction zone of the reactor to form product particles;
    collecting the product particles using a collector to form a web; and
    applying a force to the web to displace it continuously away from the reaction zone whilst forming it into a fibre.

2. A process as claimed in claim 1, wherein the force applied to the web is a mechanical force.

3. A process as claimed in claim 2, wherein the web is formed into a fibre and the mechanical force applied to the web is applied by means of a rotating spindle on which the fibre is wound.

4. A process as claimed in claim 2, wherein the mechanical force applied to the web is applied by an accelerating gas flow.

5. A process as claimed in claim 1, wherein the force applied to the web is an electrostatic force.

6. A process as claimed in claim 1, wherein the force applied to the web is a magnetic force.

7. A process as claimed in claim 1, wherein the product particles are fibrillar.

8. A process as claimed in claim 7, wherein the fibrillar product particles are nanodimensional.

9. A process as claimed in claim 1, wherein the one or more gaseous reagents are reacted at a temperature of 500 to 1600° C.

10. A process as claimed in claim 1, wherein the one or more gaseous reagents are mixed with a diluent gas.

11. A process as claimed in claim 1, further comprising the step of contacting the fibre with a treatment fluid.

12. A process as claimed in claim 1, further comprising the step of annealing the fibre with one or more fibres by heating.

13. A process as claimed in claim 1, further comprising the step of spinning the fibre with one or more other fibres.

14. A process as claimed in claim 1, further comprising the step of respinning or drawing a fibre from the web.

15. A process as claimed in claim 1, wherein the product particles comprise carbon or boron nitride.

16. A process as claimed in claim 15, wherein the product particles comprise carbon nanotubes or carbon nanofibres.

17. A process as claimed in claim 15, wherein the gaseous reactant is a carbon source and the carbon source is reacted in the presence of a catalyst.

18. A process as claimed in claim 17, wherein the carbon source is reacted in the presence of a promoter.

* * * * *